United States Patent [19]
Connery et al.

[11] Patent Number: 5,937,169
[45] Date of Patent: Aug. 10, 1999

[54] OFFLOAD OF TCP SEGMENTATION TO A SMART ADAPTER

[75] Inventors: Glenn William Connery; W. Paul Sherer, both of Sunnyvale; Gary Jaszewski, Los Gatos; James S. Binder, San Jose, all of Calif.

[73] Assignee: 3Com Corporation, Santa Clara, Calif.

[21] Appl. No.: 08/960,238

[22] Filed: Oct. 29, 1997

[51] Int. Cl.$^6$ .................................................. G06F 13/38
[52] U.S. Cl. ...................................................... 395/200.8
[58] Field of Search .................. 364/DIG. 1, DIG. 2; 395/200.3, 200.36, 200.37, 200.48, 200.5, 200.53, 200.55, 200.6, 200.66, 200.8

[56] References Cited

U.S. PATENT DOCUMENTS

| 5,321,819 | 6/1994 | Szczepanek | 395/200.8 |
| 5,727,149 | 3/1998 | Hirata et al. | 395/200.8 |

OTHER PUBLICATIONS

Postel, J., "The TCP Maximum Segment Size and Related Topics", rfc879, dated Nov. 1983, printed from web site "http:// www.cis.ohio–state.edu/htbin/rfc", 10 pages.

Clark, D., "Window and Acknowledgement Strategy in TCP", rfc813, dated Jul. 1982, printed from web site "http://www.cis.ohio–state.edu/htbin/rfc", 18 pages.

"Transmission Control Protocol: DARPA Internet Program Protocol Specification", rfc793, prepared by Univ. of Southern Calif., dated Sep. 1981, printed from web site "http:// www.cis.ohio–state.edu/htbin/rfc", 77 pages.

"Internet Protocol: DARPA Internet Program Protocol Specification", rfc 791, prepared by Univ. of Southern Calif., dated Sep. 1981, printed from web site "http:// www.cis.o-hio–state.edu/htbin/rfc", 42 pages.

Gilbert, H., "Introduction to TCP/IP", dated Feb. 2, 1995, printed from web site "http://pclt.cis.yale.edu/pclt/comm/tcpip.htm", 5 pages.

*Primary Examiner*—Robert B. Harrell
*Attorney, Agent, or Firm*—Mark A. Haynes; Wilson, Sonsini, Goodrich & Rosati

[57] ABSTRACT

A method is provided for sending data from a data source executing a network protocol such as the TCP/IP protocol stack, which includes a process for generating headers for packets according to the network protocol. The method includes sending such data on a network through a smart network interface. The network protocol defines a datagram in the data source, including generating a header template and supplying a data payload. The datagram is supplied to the network interface. At the network interface, a plurality of packets of data are generated from the datagram. The plurality of packets include respective headers, such as TCP/IP headers, based on the header template, and include respective segments of the data payload. The network interface supports packets having a pre-specified length, and the data payload is greater than the pre-specified length, such as two to forty times larger or more. Thus, the higher layer processing specifies a very large datagram, which is automatically segmented at the network interface layer, instead of at the TCP layer.

83 Claims, 6 Drawing Sheets

OFFLOAD OF TCP SEGMENTATION TO A SMART ADAPTER

BACKGROUND OF THE INVENTION

1. Field of the Invention

The present invention relates to network protocols for data networks; and more particularly to a process for offloading higher protocol layer processing such as TCP/IP processing for sending data files onto a smart network interface adapter.

2. Description of Related Art

Data networks are controlled by network protocols which according to the commonly used ISO model are classified into layers. The ISO layers include a physical layer, a data link layer of which the medium access control MAC layer is a subset, a network layer and so on.

The physical and MAC layers are typically implemented on network adapter cards with efficient integrated circuits. Higher layers are handled by software drivers for the adapter cards and by a protocol stack executed in the host processor. The drivers and protocol stack require relatively intense processing by the host, particularly in serving applications that require substantial network traffic.

According to typical protocols, the host processor composes the packets, generates headers and checksums, and transfers the composed packets down the stack to the driver. The driver sends the packet to the network adapter card. As the data is transferred down the stack to the card, significant host processing at each layer is required.

One common protocol stack includes the transmission control protocol TCP running over the Internet Protocol IP, commonly referred to as TCP/IP. TCP is a connection oriented, end-to-end reliable protocol designed to fit into a layered hierarchy of protocols which support multi-network applications. Processes running in the host system transmit data by calling on TCP and passing buffers of data as arguments. The TCP packages the data from these buffers into appropriately sized segments, and calls on the IP layer to transmit each segment to the destination. On the receive side, the TCP stack/layer places the data from one or more segment into the receiving user's buffer, and notifies the receiving user.

The IP module is associated with the TCP and provides an interface to the local network. This IP module packages the TCP segments inside Internet packets and routes these packets to a destination at the IP layer, or to an intermediate gateway. The IP module may also break the TCP segments into smaller IP fragments, to address lower layer packet size issues. To transmit the packet through the local network, it is embedded in a local network packet at lower layers of the process. The drivers at the lower layers may perform further packaging, fragmentation or other operations to achieve the delivery of the local packet to the destination.

Transmission according to the TCP/IP model is made reliable via the use of sequence numbers and acknowledgments. Conceptually, each octet of data is assigned a sequence number. The sequence number of the first octet of data in a segment is transmitted with that segment, and is called the segment sequence number. Segments also carry an acknowledgment number which is the sequence number of the next expected data octet of transmissions in the reverse direction. When the TCP module transmits a segment containing data, it puts a copy on the transmission queue and starts a timer. When acknowledgment for that data is received, the segment is deleted from the queue. If the acknowledgment is not received before the timer runs out, the segment is retransmitted.

To govern the flow of data between TCP modules, a flow control mechanism is employed. The receiving TCP module reports a window to the sending TCP. This window specifies the number of octets, starting with the acknowledgment number, that the receiving TCP is currently prepared to receive. The number of bytes specified as the window, is the maximum number of bytes which a sender is permitted to transmit until the receiver opens some additional window. Thus, the sender controls the amount of data sent onto the network so that it does not exceed the size of the advertised window of the destination.

According to the typical prior art system, the size of the segment sent by the TCP protocol down to the IP layer must match one-to-one with the packets transmitted by the IP layer to the network (ignoring IP fragmentation). The driver passes packets from the IP layer to the MAC in the network interface card. For example, in the network driver interface specification NDIS driver model for Windows based platforms, packets are passed to the MAC driver as NDIS_PACKET structures. These structures are basically a list of buffers that put together make up the packet. Also, some out-of-band OOB data is allowed per packet according to the NDIS model (for example, an indication of priority). These packet structures are constrained to the maximum packet size for the media, for example 1514 bytes for Ethernet. This packet size structure propagates up the TCP/IP protocol stack. This requirement results in significant processing at and above the TCP layer in order to package large buffers for transmission across the network.

Accordingly, it is desirable to improve the performance of data processing systems, by simplifying the higher layer processing which must be performed by the host system in order to transmit large quantities of data across data networks.

SUMMARY OF THE INVENTION

According to the present invention, a significant portion of the higher layer transmit processing is offloaded onto a smart adapter. The present invention accomplishes this offloading without interfering with other processing in the system, without breaking other protocols, and without harming the performance to the overall system.

The present invention provides a method for sending data from a data source executing a network protocol, such as the TCP/IP protocol stack, which includes a process for generating packet control data, such as TCP/IP headers for packets according to the network protocol. The method includes sending such data on a network through a smart network interface. According to the process, the network protocol defines a large datagram from the data source (buffer), including generating a packet control data template and supplying a data payload. The datagram is supplied to the network interface. At the network interface, a plurality of packets of data are generated from the datagram. The plurality of packets include respective packet control fields, such as TCP/IP headers, based on the packet control data template, and include respective segments of the data payload. According to the present invention, the network interface supports packets having a pre-specified length, and the data payload is greater than the pre-specified length, such as two to forty times larger or more.

Thus, the higher layer processing specifies a very large datagram, which is automatically segmented at the network interface layer, instead of at the TCP layer. Significant host processing is thus offloaded to a smart network interface. For the Ethernet example in which the maximum packet size on the medium is 1514 bytes, the protocol according to the present invention is allowed to pass much bigger datagrams, up to 64k bytes or more, knowing that the smart adapter will take care of segmenting them into proper sized Ethernet packets and transmitting them. Except for the fact that the datagrams are very large, substantially the same interface and data structure can be used.

According to other aspects of the invention, the network protocol comprises TCP/IP. The TCP/IP header template has an IP total length field set to indicate the length of the data payload. The step of generating in the network interface a plurality of packets includes setting the IP total length fields in the plurality of packets based on the size or sizes of the respective segments of the data payload included in the plurality of packets. Also, in the TCP/IP header template, an IP identification field is set to an initial value for the datagram. In generating the packets at the network interface layer, IP identification values are set based on the initial value, such as by using the initial value for the first packet, and incrementing it thereafter until all packets for the datagram have been transmitted. In addition, the TCP/IP header template includes an initial TCP sequence number for the datagram. In generating the plurality of packets, TCP sequence numbers are provided in each packet based on the initial TCP sequence number and the size or sizes of the respective segments of the data payload. According to another aspect of the invention, the TCP/IP header for TCP/IP protocols includes an IP header checksum field, and a TCP checksum field. In generating the plurality of packets based on the datagram, the network interface computes the IP header checksums and TCP checksums for each of the plurality of packets.

Other TCP/IP functions are either disabled or supported for the large datagrams, without requiring modification of the underlying protocol functions.

The present invention can also be characterized as a method for sending data from a data source executing a TCP/IP network protocol. The method according to this aspect includes establishing a connection with a destination for a session according to the TCP/IP network protocol. Next, a TCP window size is determined from the destination which indicates an amount of data the destination is ready to receive. The datagram is defined in the data source by generating a TCP/IP header template and supplying a data payload having a size less than or equal to the window size. The datagram is supplied, along with a segment size parameter and a request to segment the datagram to the network interface. In the MAC driver in the network interface, a plurality of packets are generated in response to the segment size parameter and to the request to segment. The plurality of packets is composed from the datagram by executing processes in the network interface to provide respective TCP/IP headers based on the TCP/IP header template, to provide respective segments of the data payload having lengths equal to or less than the segment size parameter, and to compute IP header checksums and TCP checksums for the plurality packets. The packets are then sent to the destination. Finally, an acknowledgment is received from the destination that the plurality of packets was successfully sent according to the network protocol.

If a TCP packet with a non-zero data payload is received before a last packet in the plurality of packets is sent, then there is a possibility that the windowing and sequencing of the TCP protocol will fall out of synchronism. This can be ignored, or a variety of optional techniques can be applied to handle it or reduce its impact. Thus, according to one alternative, all unsent packets in the plurality of packets for the datagram are abandoned by the network interface if a TCP packet with a non-zero payload is received before the last packet is sent. It is responsibility of the higher layer to resend the datagram in this case. According to another alternative, the step of generating the plurality of packets includes the processes before sending each packet of determining whether a more recent datagram for the same session has been supplied to the network interface. If no more recent datagram has been supplied, then the TCP header acknowledgment number and window field are set to the values in the TCP/IP header template. If a more recent datagram has been supplied, then the TCP header acknowledgment number and window field are set to the values in the TCP/IP header template of the more recent datagram. According to another alternative, the MAC in the network interface may hold onto the received packets for this session until the last packet has been sent.

According to yet another aspect of the invention, the process includes sending a plurality of datagrams to the network interface for the same session. Sequence numbers are assigned to the plurality of datagrams. The step of generating the plurality of packets for current datagram includes determining whether a more recent datagram has been supplied having a sequence number which precedes a sequence number in the current datagram. If it has, then the generating of the plurality of packets for the current datagram is stopped, and the generating of the plurality of packets for the more recent datagram is begun. This tends to maintain the order of transmission to a greater degree, in the event that an earlier transmitted datagram in the sequence is being retransmitted.

Also, in the process of sending a plurality of datagrams to the network interface for the same session, the step of generating the plurality of packets for a current datagram includes for a last packet in the plurality of packets, determining whether data from a following datagram falls in sequence with it. If it does, then data from the current datagram may be concatenated with data from the following datagram to compose the last packet.

A variety of other optimizations and techniques for offloading TCP/IP segmentation to a smart adapter are provided according to the present invention. Furthermore, the present invention is also extendable to offloading further TCP layer send processing to the smart adapter.

These processes provide significant benefits. For example, servers send more data than they receive, and most network benchmarks are even more heavily weighted to sending. Handling a large quantity of data at the TCP layer allows the protocol, for example, to avoid allocating blocks of data for copies of the packet header, copying it, and freeing it. A variety of other processes involved in the transitions from protocol to driver are also avoided, including a variety of interrupts for transmit completions for the packets, for acknowledgments of the packets, and for other processing steps.

According to other variations, a shared state structure can be created in which ACK and window parameters for the TCP/IP protocol stack are maintained. The MAC driver updates the ACK and Window parameters in outgoing packets from the shared structure periodically. Also, in other embodiments the windowing and retransmission algorithms are handled at higher layers without requiring the network interface to pick these up. The protocol would simply have to limit itself to payload data up to the end of the advertised window. Other subsets and variations are also possible. For example, the MAC driver could manage the transmit window, watching incoming receive frames for an opening in the window and only transmitting datagrams within the current window.

Other aspects and advantages of the present invention can be seen upon review of the figures, the detailed description, and the claims which follow.

DETAILED DESCRIPTION

Figure 1:
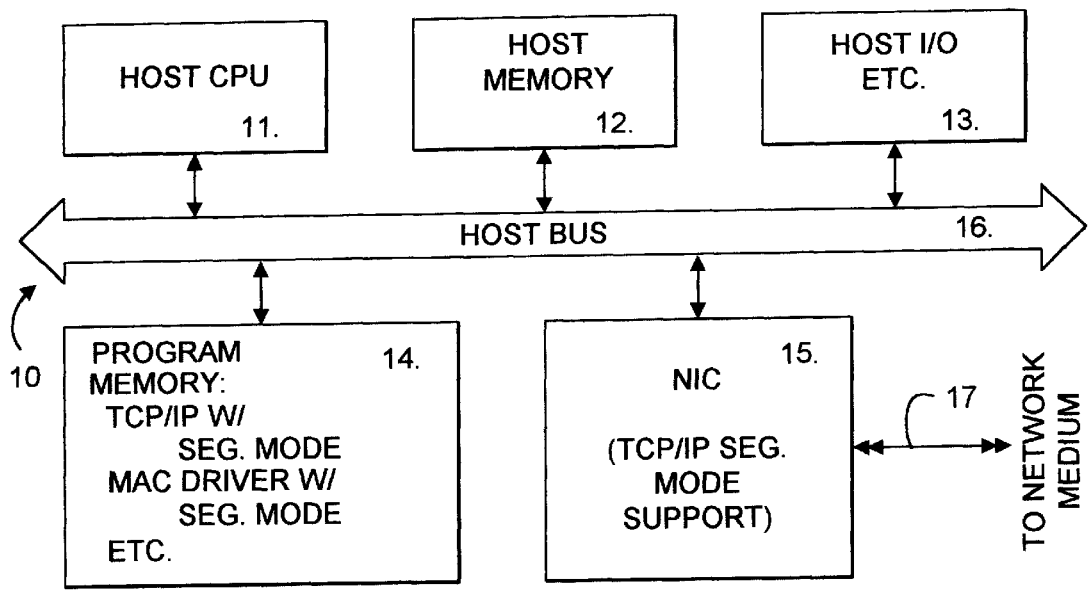
FIG. 1 is a simplified block diagram of a data processing system with offloading according to the present invention.
Figure 2:
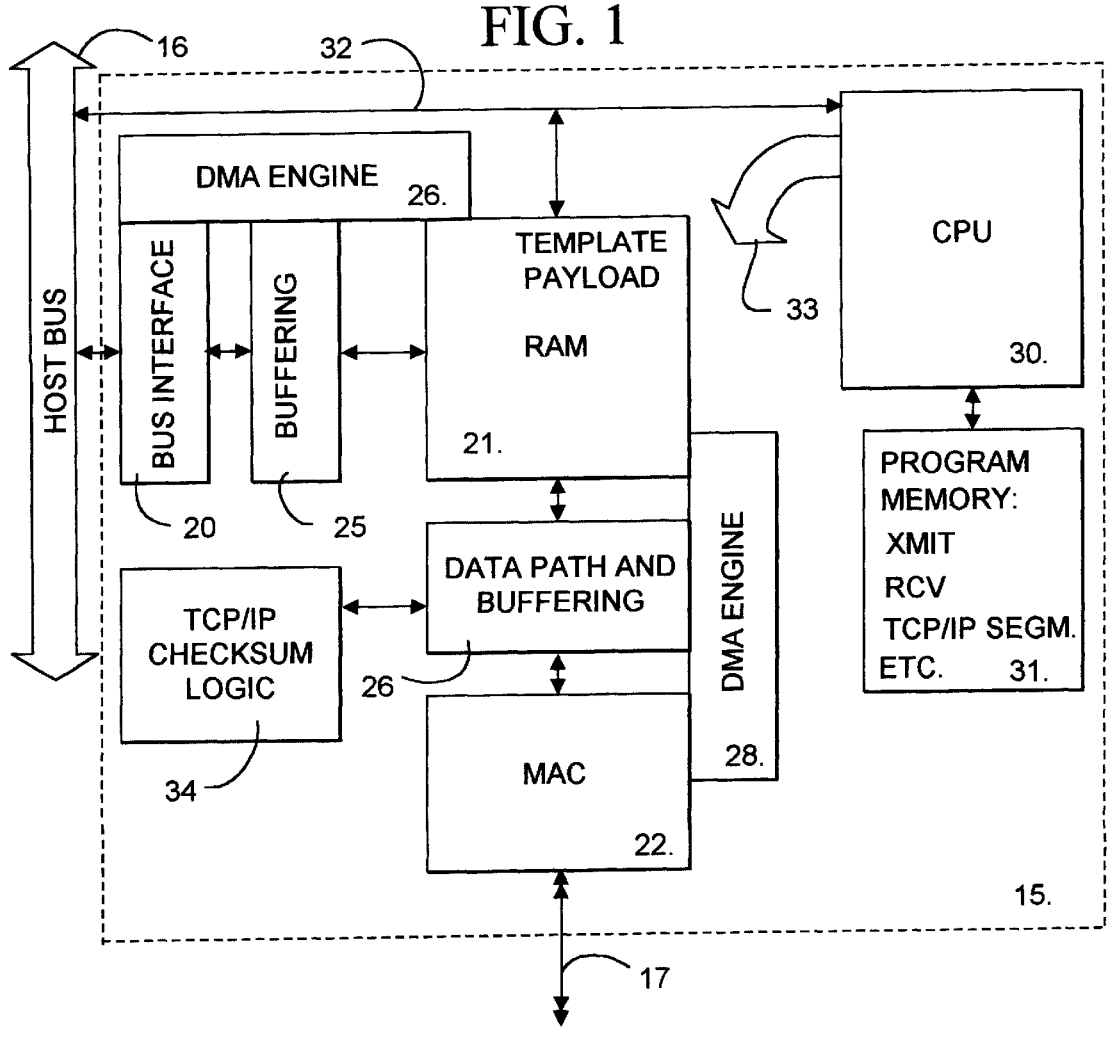
FIG. 2 is a simplified block diagram of a smart network interface card implementing the TCP segmentation of the present invention.

A detailed description of the present invention is provided with respect to FIGS. 1–7, in which FIGS. 1 and 2 illustrate the hardware system environment.

FIG. 1 shows a data processing system 10 which includes a host central processing unit 11, host memory 12, host input/output devices 13, such as keyboards, displays, printers, a pointing device and the like. The system also includes a program memory 14 (usually part of the host memory block) and a network interface card 15. All these elements are interconnected by a host system bus 16. The network interface card 15 provides for connection to a network medium as indicated at line 17.

FIG. 1 is a simplified diagram of a computer, such as a personal computer or workstation. The actual architecture of such systems is quite varied. This system for one example corresponds to a personal computer based on the Intel microprocessor running a Microsoft Windows operating system. Other combinations of processor and operating system are also suitable.

According to the present invention, the program memory includes a TCP/IP protocol stack with a segmentation mode according to the present invention. A MAC driver is also included in the program memory which supports the segmentation mode. Other programs are also stored in program memory to suit the needs of the particular system. The network interface card 15 includes resources to manage TCP/IP segmentation according to the present invention.

FIG. 2 provides a simplified block diagram of the network interface card 15 of the present invention. The network interface card 15 includes a bus interface 20 coupled to the host bus 16. A memory composed of random access memory RAM 21 is included on the card 15. Also, a medium access control unit 22 is coupled to the card which is coupled to the network interface 17. The path from the host bus interface 20 to the RAM 21 includes appropriate buffering 25 and a DMA engine 26 in order to offload processing from the host system for transferring data packets into the RAM 21. Also, the data path from the RAM 21 to the MAC unit 22 includes appropriate data path and buffering logic 26 to support efficient transmission and reception of packets. A DMA engine 28 is also included on this path to provide for efficient transferring of data between the network medium 17 into the RAM 21. Also included on the card 15 is a central processing unit 30 having a program memory 31. The CPU 30 is coupled to the host bus 16 and to the RAM 21 on line 32. Also, the CPU 30 generates control signals represented by the arrow 33 for controlling other elements of the network interface card 15. Also according to this embodiment, TCP/IP checksum logic 34 is coupled to the data path and buffering logic 27 in the path from the RAM 21 to the network medium 17. The program memory for the CPU 30 includes the transmit, receive, TCP/IP segmentation control and other processes which manage the operation of the smart adapter card.

The block diagram illustrated in FIG. 2 provide a simplified overview of the functional units in a network interface according to the present invention. A variety of other architectures could be implemented to achieve similar functions. For example, DMA engines 26, 28 are not strictly required here. State machines handshaking with each other, or other data processing resources could move data from one block to the next.

In one embodiment, all of these elements are implemented on a single integrated circuit. In another embodiment, all elements except for the RAM 21 are implemented on a single integrated circuit. Other embodiments include discreet components for all of the major functional blocks of the network interface card.

Figure 3:
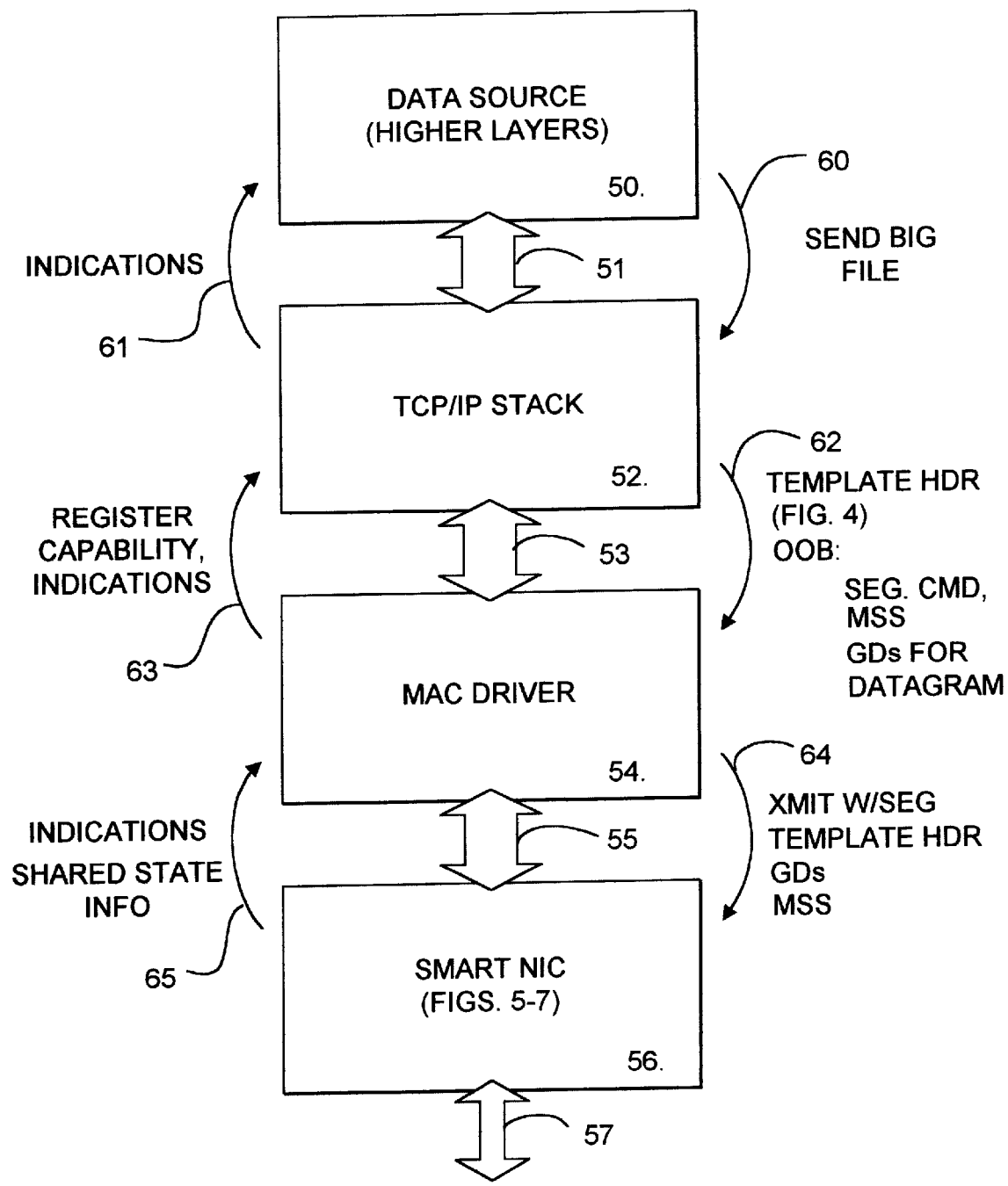
FIG. 3 is a network protocol layer diagram which provides a simplified illustration of the present invention.

FIG. 3 is a simplified diagram of the network protocol layers implemented according to the present invention. The protocol layers include a data source 50 which corresponds to the higher layers of the network protocol. The data source is coupled by path 51 to the TCP/IP stack 52. The TCP/IP stack 52 is coupled by a path 53 to the MAC driver 54. The MAC driver is coupled by path 55 to the smart network interface card 56. The smart network interface card 56 is coupled by path 57 to the network medium.

According to the present invention, the data source 50 sends a big buffer acrorss path 51 along with a command on line 60 to the TCP/IP stack 52. The TCP/IP stack 52 generates appropriate indications on line 61 to the data source 50 to manage delivery of the big buffer to its destination.

Figure 4:
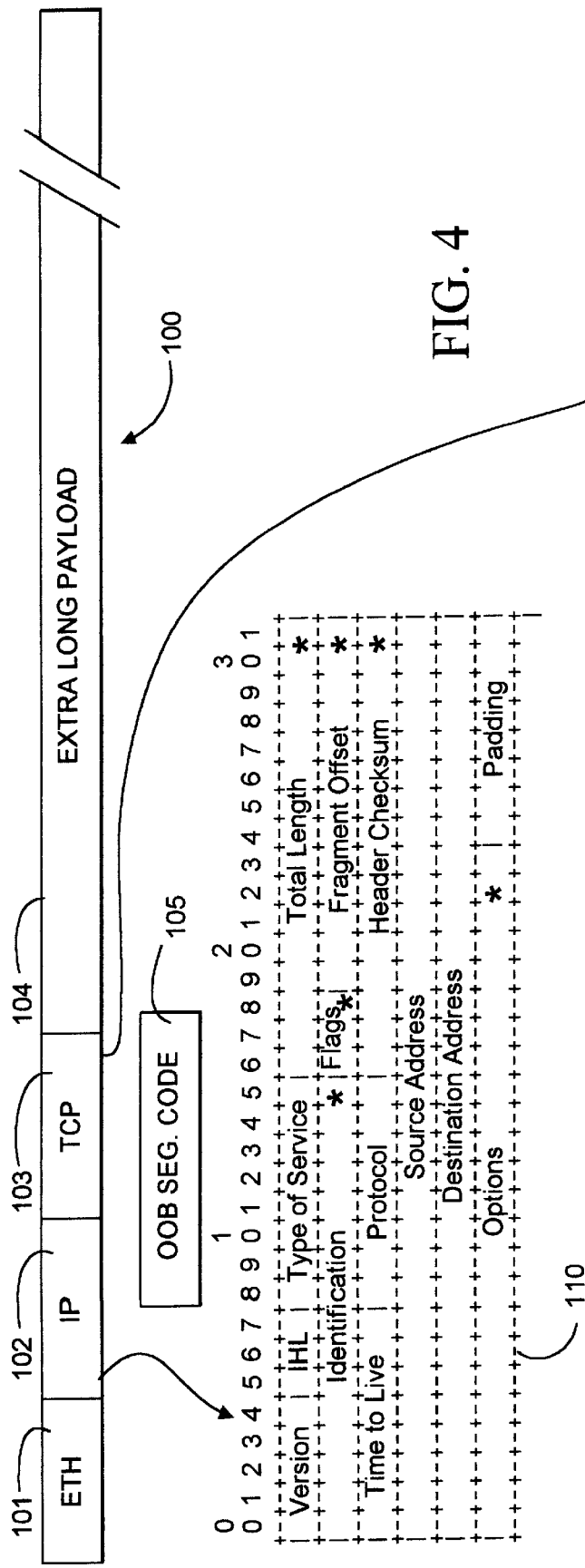
FIG. 4 is a simplified diagram of a TCP/IP header template generated according to the present invention.
Figure 4:
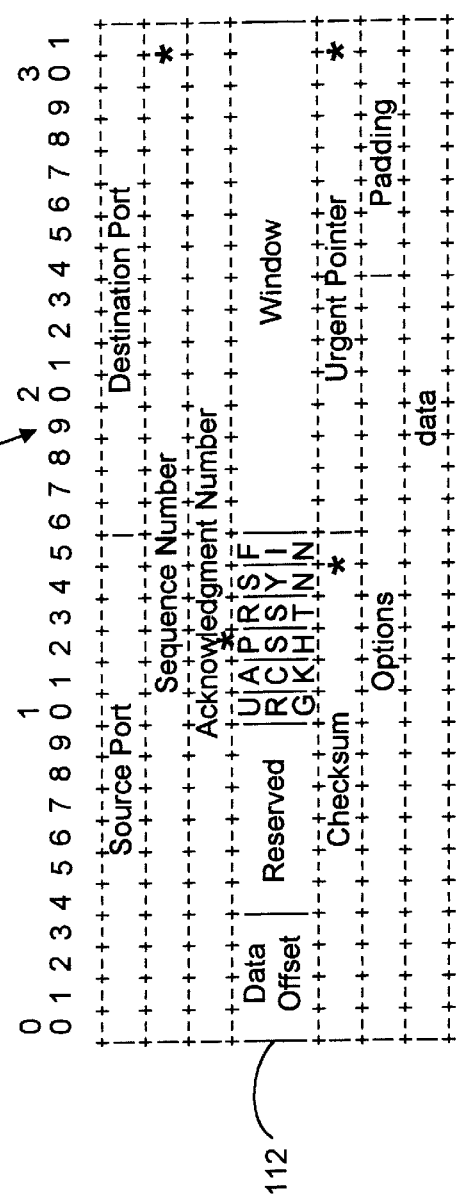

The TCP/IP stack 52 determines that segmentation offload is suitable for the buffer based on a variety of network state parameters. If it is suitable, then a template header, such as shown in FIG. 4, and out-of-band data are sent on line 62 to the MAC driver 54. The out-of-band data includes a segmentation command and a maximum segment size MSS. Gather descriptors GDs for the datagram to be sent are also supplied for the buffer. The MAC driver 54 registers the capability to do the segmentation offload processing with the TCP/IP stack 52, and supplies appropriate indications to the TCP/IP stack 52 to manage delivery of the data on line 63. The MAC driver 54 sends the transmit command with segmentation along with the template header, the gather descriptors for the buffer, and the MSS parameter as indicated at line 64 to the smart network interface card hardware 56. The smart network interface card 56 also sends appropriate indications on line 65 back to the MAC driver 54. The smart network interface hardware 56 processes the datagram by segmentation according to the parameters supplied by the higher layers, and sends the datagram segmented into packets on the network medium 57.

One preferred embodiment of the present invention is to support the Windows 32 (Windows NT, Windows 95) operating systems provided by Microsoft Corporation. According to the Windows 32 environment, the so-called NDIS specification provides the functionality of the MAC driver layer of the protocol stack. The MAC driver is modified to implement the new TCP segmentation functionality according to the present invention in this example. When supported by the driver, an aware TCP/IP stack can offload certain processing to the adapter.

The TCP/IP protocol passes "large datagrams" to the NDIS driver's MiniPortSend routine. These datagrams are properly formatted, except for the IP and TCP checksums. Normal media, IP, and TCP headers are present, along with a larger than usual payload. Along with the datagram, a session MSS will be passed, telling the driver what size pieces to cut the payload into. The driver will then cut the datagram into packets, using the "template" headers from the datagram along with certain simple rules to produce the actual packets to be sent on the media.

For this example, the protocol can pass down only payload which can be transmitted immediately, ie. is within the advertised window of the other side.

A "large datagram" send may not be completely sent by the MAC driver. On completion, the TCP/IP protocol might look at some NextSEQ field to determine how much payload the driver actually sent, and perhaps where to pick up again with the next send attempt.

The term "datagram" is used herein to refer to the buffer, such as a large NDIS_PACKET, passed down from the protocol to the MAC driver for segmentation.

The term "packet" is used generally to refer to the media-sized packets that result from segmenting the datagram.

The headers of the datagram are the "template", since they are copied to the media packets during segmentation with a few simple changes.

The data beyond the TCP/IP header in the datagram is referred to as the "payload".

This description is generally written from the point of view of the MAC driver. As such "incoming" refers to datagrams being passed down from the protocol, and "outgoing" refers to packets being transmitted onto the wire after segmentation.

Basically we have substituted a single "large packet" send for a number of smaller sends. The goal is to reduce host CPU utilization and improve performance and scalability. Each MiniPortSend call to send a packet must handle transitions from TCP thru IP, various intermediate drivers and the NDIS miniport wrapper to the MAC driver, as well as handle similar transitions on send completion. This overhead can be quite significant at high wire speeds. Also, though computing the header for each new packet is likely quite simple (ack+=bytes; id++; etc), the header must be copied to a new buffer for each send. An NDIS_PACKET structure must be obtained from a free queue, filled in, queued elsewhere, etc. And of course there is a significant physicalization penalty for each packet. Also the number of interrupts on the host CPU is reduced to one per "large packet" rather than one per packet or one per some number of packets (algorithmic). Offloading TCP segmentation to the adapter will help reduce all of this quite significantly.

This description is based on Internet Protocol, version 4, IPv4 processing, though other versions are also suitable. For IPv4, the processing is managed as follows:

The IP Total Length field is 16 bits and as such limits the size of the incoming datagram IP+TCP+Payload to 64k. This specification allows larger payloads for example by setting the IP Total Length field to zero (0) on incoming datagrams (in this case the length of the incoming datagram must be determined by examining the GD).

The IP "don't fragment" bit is legal. The IP "more fragments" bit is not. If IP fragmentation is required, it must be done by the protocol. As such the IP fragment offset field must be zero also.

The IP Header Checksum field can be left undefined.

Various TCP flags are illegal on incoming datagrams to be segmented. The RST, SYN and FIN flags are all disallowed.

The TCP Checksum field can be left undefined.

TCP and IP options are allowed but will be sent on each packet which may not be appropriate. In alternatives, more management of the options field could be executed in the NIC, to handle each packet to which the template applies individually, for example.

The MAC driver takes the incoming datagram, consisting of a template header and a payload, and carves it up into packets. Packets are generated by cutting the payload into chunks based on the MSS passed down. All packets but the last will have a payload exactly MSS bytes in size. The last may be smaller.

The header of outgoing packets is derived from the template header on the incoming datagram as follows:

The sizes of the media, IP, and TCP headers are all identical to those in the template.

Unless otherwise specified, fields are simply copied from the template to the outgoing packet without change.

The media header is used exactly.

The IPv4 header is copied exactly, except:
the IP Total Length field in the outgoing packets is computed correctly for each packet.
the IP Identification field (ID) is advanced for each packet, with the first packet's ID copied from the template, the second's set to that plus one, etc. The protocol can either determine exactly how many IDs will be consumed by the call, or simply advance the ID field by a sufficient amount (64k/536 is 122). Since no retransmits will be done by the driver (or if they are, the same IDs will be used), the IDs that will be used by the driver are completely predictable.
the IP Header Checksum is computed for each packet.

The TCP header is copied exactly, except:
the Sequence Number (SEQ) is advanced for each packet. So the SEQ for the first packet is copied from the template, the SEQ for the second is advanced by MSS bytes, or the actual length.
the PSH bit is set to zero outgoing, unless the PSH bit was set in the template, in which case it is set on the last packet in the datagram.
the TCP checksum is computed for each packet.
the URG bit is set to zero outgoing, unless the urgent pointer falls within this packet in which case it is set to one, and the URGENT POINTER is set also (it is otherwise zero).

The template establishes ACK and Window values for the outgoing segmented packets. In most cases this should be sufficient. Most flows are unidirectional, and segmentation will likely only be used to send large blocks of data. So usually there will be no receive traffic (other than ACKs) while we are sending out a large datagram.

If receive traffic on this session does occur (a receive packet arrives for this session with a non-empty TCP payload) the ACK and Window fields could get out of date. Alternatives for handling this event include the following:

1) Ignore the issue. This would also happen with an adapter with a large transmit FIFO/queue using normal packets.
2) Receiving a data packet on a session in Segmentation Mode will cause us to abandon any pending sends for that session or that datagram. The completions will indicate how far we got, and the protocol can issue new sends with updated ACK/Window fields out of their receive packet handler.
3) The process can assume that more recently submitted sends have more accurate information. In this case, the smart network interface can carry the ACK/Window fields out of any more recent packets forward to packets being transmitted now from a current datagram. ACK/Window fields would be automatically updated as new datagrams were submitted, and ACK packets could be sent to do this without sending any data. Note that the ACKs themselves would not be deleted, just their ACK/Window information carried forward.
4) The protocol could maintain ACK and Window values for this session in an agreed upon location and the adapter could update the copies in the template periodically.
5) The MAC driver could hold onto receive packets for this session until the entire large datagram had been transmitted.

To abandon sends on a session, the driver completes the first send datagram by calling NdisMSendComplete with an error, NDIS_UNEXPECTEDRX. Any new sends submitted on this session up to the point where NdisMSendComplete returns to the driver will also be abandoned. When NdisMSendComplete returns to the driver from that first send, all of the pending packets/datagrams for that session are moved in an atomic operation to a special queue where they will be completed with the same error. Any new sends submitted from then on will be sent normally. The TCP protocol submits these from its receive packet handler (it knows this is coming because of the special error code). This avoids a critical section problem.

Protocols might have multiple segmentation datagrams outstanding on a single session at once. When a session has one or more outstanding datagrams queued up against it, it is said to be in "Segmentation mode". In this mode if another datagram (or even a regular packet) for the same session is submitted, it will also be queued for sending on this session.

It is expected that such datagrams often will be sequential, ie. that the SEQ of a second packet will be equal to the SEQ of the first plus the size of the payload in the first datagram.

Datagrams queued up for a session need not have their payload a multiple of the MSS in size. As such if two sequential datagrams are queued up for a session, an outgoing packet might result from bytes at the end of the first datagram and bytes at the start of the second.

According to one embodiment, the driver will attempt to send pending datagrams for a given session in SEQ order. Thus if an incoming series of ACKs causes the protocol to want to resend some old data, the more recent datagram with that old SEQ will get priority over other payload data with later SEQ's including the current datagram. The driver should be prepared to switch over from the current datagram partially transmitted to another more recent datagram with an earlier SEQ if such is submitted. This need not be done instantaneously, but should be done reasonably quickly. The idea here is that if the protocol wants to retransmit some older payload, that retransmit is given some priority.

In another feature, the driver can take advantage of later templates. If a second datagram is queued up against a session with more recent ACK and Window information, the driver could take advantage of that even while still transmitting the first datagram.

In order to support the Simple TCP Segmentation offload, a bit in some agreed upon word indicating the capability can be set.

When the TCP/IP stack sends a datagram on which it wants TCP Segmentation to be done by the driver, it sets the following bit in Send Flags, or its equivalent in OOB_DATA or some new location in NDIS_PACKET:
fNDIS_PACKET_TCPSEG Also in a location in the OOB_DATA (or a new location in NDIS_PACKET) the value:
UINT MSS;
passes the MSS for this session down to the driver to be used in cutting up the payload into packets. This value may also be sent as part of a structure by passing a pointer instead.

MiniportSendPackets is equivalent to MiniportSend.

In the NdisMSendComplete block, when the driver completes a datagram on which it has done TCP Segmentation, it sets the following bit (or its equivalent) in Send Flags:
fNDIS_PACKET_TCPSEG Also in a location in the OOB_DATA (or elsewhere in NDIS_PACKET) is passed:
UINT NextSEQ;
where NextSEQ is the sequence number following the last byte sent by the MAC. Again this might be part of another structure by passing a pointer to that structure instead. If the entire datagram was sent then this is the byte after the entire payload in the datagram, ie. template SEQ+len(payload). If for some reason the entire datagram was not sent, this is the byte at which the protocol might want to pick up sending again. Since multiple datagrams can be queued up, NextSEQ could be well after the last byte of payload in this datagram and still indicate success.

The protocol need not look at NextSEQ unless an error is indicated. If Status is NDIS_STATUS_SUCCESS, the entire datagram was sent. However, if one of the following new errors (or their equivalent) is indicated, the protocol will have to look at NextSEQ:

NDIS_STATUS_UNEXPECTEDRX—a packet was received on this session with a non-empty TCP payload. As a result we are abandoning any sends or other option queued up for this session.

NDIS_STATUS_INCOMPLETE—some of the datagram was transmitted but not all. The protocol should pick up where the driver left off.

In general the driver should behave as it would have if packets were sent individually. So the statistics should be updated based on the outgoing segmented packets, not the incoming datagrams.

FIG. 4 illustrates the structure of the datagram generally 100 which includes the large payload with standard control structures in a template format. The control structures include the basic MAC layer header 101, an Ethernet header in this example, followed by an IP header 102, followed by a TCP header 103. After the control structures, an extra long payload 104 is coupled to the datagram. Also with the datagram 100 according to a preferred embodiment is an out-of-band segmentation structure 105. The out-of-band OOB segmentation structure includes the MSS parameter, and the request to segment. Other state variables may also be passed through this out-of-band code 105 to facilitate communication among the protocol layers.

The IP header 102 consists of basically the standard IP header 110. The header 110 in this example is an IP version 4 header which consists of five 32 bit words (dwords). The first four bits of the first dword provide the version field indicating the format of the header. The IHL field specifies Internet header length which is equal to the length of the Internet header in 32 bit words. Thus, this points to the beginning of the TCP header 103. The next field provides the type of service indication. The type of service indication relates to the quality of service desired according to the Internet Protocol. Following the type of service field is the total length field. The total length field is the length of the datagram which in this version is 16 bits. This allows for a datagram to be up to 65,535 octets. In prior art systems, such long datagrams are impractical for most hosts and networks. However, according to the present invention, the total length field provides the total length of the datagram to be segmented at the lower layers. In alternatives, this field can be set to zero, and the length of the datagram supplied out-of-band.

The first field in the second dword of the Internet header 110 is the identification field. This provides an identification value assigned by the sender to aid in assembling the fragments of the datagram at the destination. The template header according to the present invention provides an identification field which provides an identification to be used for example in the first packet of the plurality of packets to be composed. The identification number is incremented for each subsequent packet in the plurality of packets composed from a single datagram.

The next field provides various control flags. Bit zero is reserved. Bit one DF indicates whether the datagram may be fragmented or not. This don't fragment bit may be used in the template. The more fragments MF bit (bit two) is not legal as mentioned above.

The next field specifies the fragment offset. This field is set to all zeros in the template.

The first field in the third dword of the header is a time to live parameter. This field indicates the maximum time the datagram is allowed to remain in the Internet system.

The next flag specifies the protocol. This field indicates the next level protocol used in the data portion of the Internet datagram. In this embodiment, the next level protocol is TCP.

The next field in the IP header template is the header checksum. According to the present invention, the header template leaves the header checksum undefined, such as by leaving it all zeros or otherwise. The checksum is computed in the smart network interface for each packet carrying a segment of the datagram as it is transmitted.

The next fields in the Internet Protocol header template are the source address followed by the destination address. These addresses are supplied in the template header and are copied directly into the headers of the packets carrying segments of the datagram. The last two fields include the options field and a padding field. IP options are not allowed according to one embodiment of the present invention. With more sophisticated algorithms, options can be implemented which are indicated by this header field. The Internet header padding is used to ensure that the Internet header ends on a 32 bit boundary.

Thus, the Internet header template 110 looks like the standard Internet header. However, the fields having an astricks in the figure are used as described above according to this example of the present invention.

The TCP header template 112 is also shown in FIG. 4. The TCP header template 112 specifies the source port and the destination port in a first dword of the header according to the TCP specification. After the destination port, a sequence number is provided. The sequence number is a 32 bit sequence number corresponding to the number of the first data octet in this segment. The sequence number in the template is used in the header for the packet carrying the first segment of the datagram. Sequence numbers are updated automatically by the smart interface card for each subsequent packet carrying a segment of the datagram.

The next field in the TCP header template is the acknowledgment number. This is a 32 bit control field that contains the value of the next sequence number a sender of the segment is expecting to receive if the ACK bit is set. Once a connection is established, this parameter is always sent. Thus, the value is included in the TCP header template and copied directly for each packet of the plurality of packets sent for the datagram according to this embodiment of the present invention. In other embodiments, the acknowledgment number is automatically updated using processing in the smart interface during the processing of the datagrams.

The next field in the TCP header template is the data offset. This is a 4 bit number which indicates the number of 32 bit words in the TCP header. This indicates where the data payload 104 begins. After the data offset, a 6 bit reserved field is placed in the header. After that, 6 control bits are provided. These control bits are handled as discussed above for the TCP header template. After the control bits, the window parameter is provided. This is the number of data octets beginning with the one indicated in the acknowledgment field (acknowledgment number in the template) which the sender of this segment is willing to accept. The window value is again copied for each packet to be sent which carries segments of the datagram. In some embodiments, the window parameter can be updated by the smart interface card as mentioned above.

Following the window field is the checksum field. According to the template, the checksum is left undefined. The checksum is computed for the TCP segment for each packet to be transmitted carrying a segment of the datagram.

After the checksum field, the urgent pointer field is provided. This field communicates the current value of the urgent pointer as a positive offset from the sequence number in this segment. This field is only interpreted when the URG control bit is set, which is not allowed in one embodiment of the segmentation process of the present invention. Thus, the TCP urgent pointer must be set to zero in the template for this example. Alternatively, the URG bit and URG pointer may be allowed, and set when we transmit the packet the URGENT pointer indicates. That is, the adapter sets the URG pointer in the packet which carries the byte which the URG pointer in the template identifies.

Following the urgent pointer is the options field for TCP. The options field is allowed, and can be set to any of the variable option values allowed according to the TCP protocol. Thus, the option field can be a single octet indicating the option kind, or an octet indicating option kind, an octet indicating option length, and the actual option data octets. After the options field, the padding field is defined to ensure ending on a 32 bit boundary in the heading.

After the padding, the actual data payload 104 is found. As mentioned above, an astricks in the fields of the TCP header template 112 in FIG. 4 indicate which fields are involved in the template processing for this example.

The out-of-band segmentation code 105 illustrated in FIG. 4 can be provided in a variety of manners. For example, this segmentation code may be provided by supplying it as an element of a reserved field in the template headers. The reserved fields are read by the smart interface card, and the control codes are removed from the headers of the packets carrying segments of the payload. An alternative embodiment, the out-of-band communication can be provided by providing a shared state variable for use by the network interface card and the higher layer protocols. By reading and writing from the shared state variable, all the information concerning the segmentation process can be provided to the various layers of processing. The out-of-band data can also be provided in the NDIS environment by using reserved fields in the NDIS packet structure.

This example is based on version 4 of the Internet protocol. Other versions are also suitable for implementation of the present invention with modifications of the templates as appropriate. Furthermore, the present invention may be applied to other network protocol stacks as suits a particular implementation.

Figure 5:
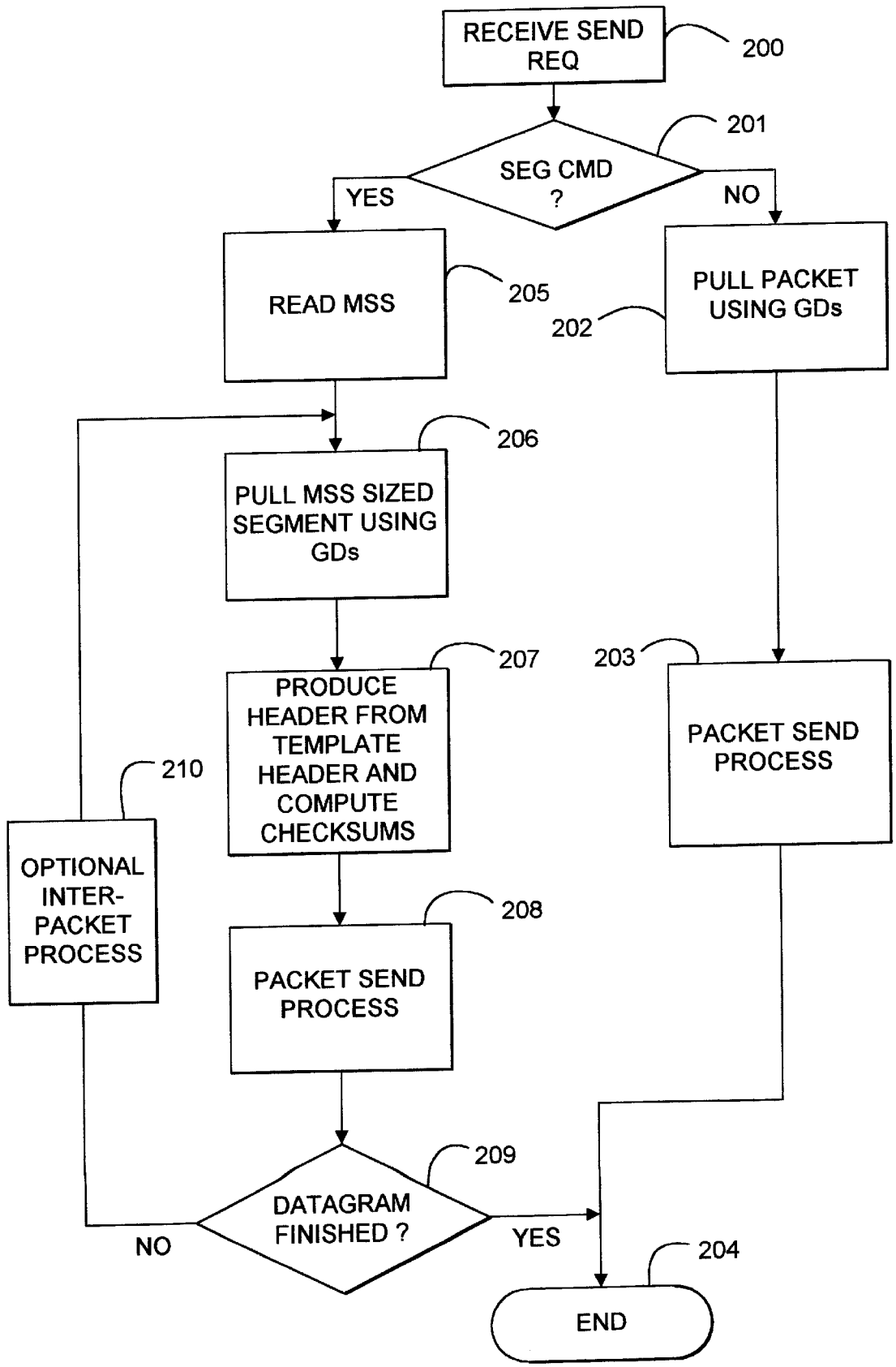
FIG. 5 provides a flow chart of the datagram handling processes executed by the network interface according to the present invention.
Figure 6:
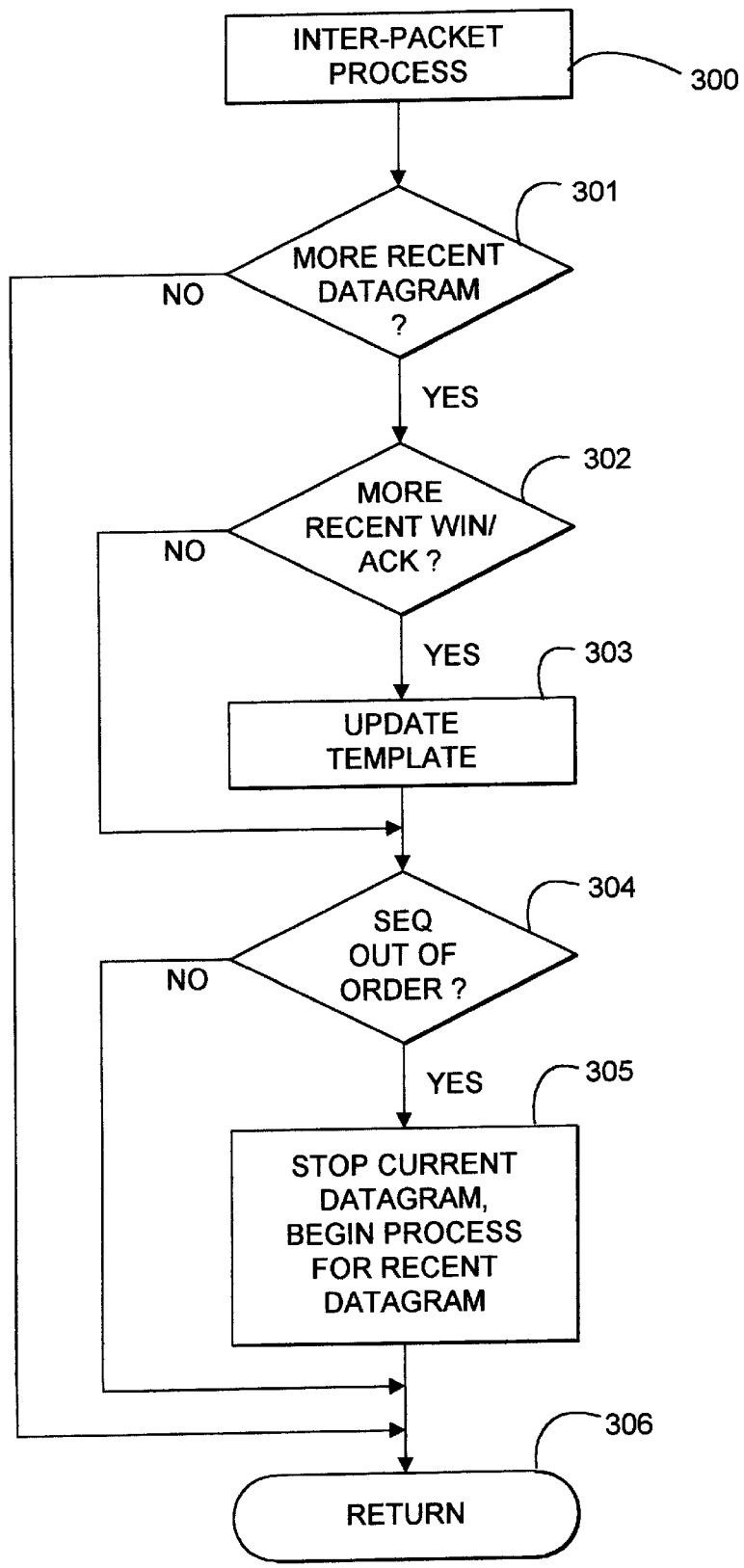
FIG. 6 illustrates optional inter-packet processes to be executed by the network interface.
Figure 7:
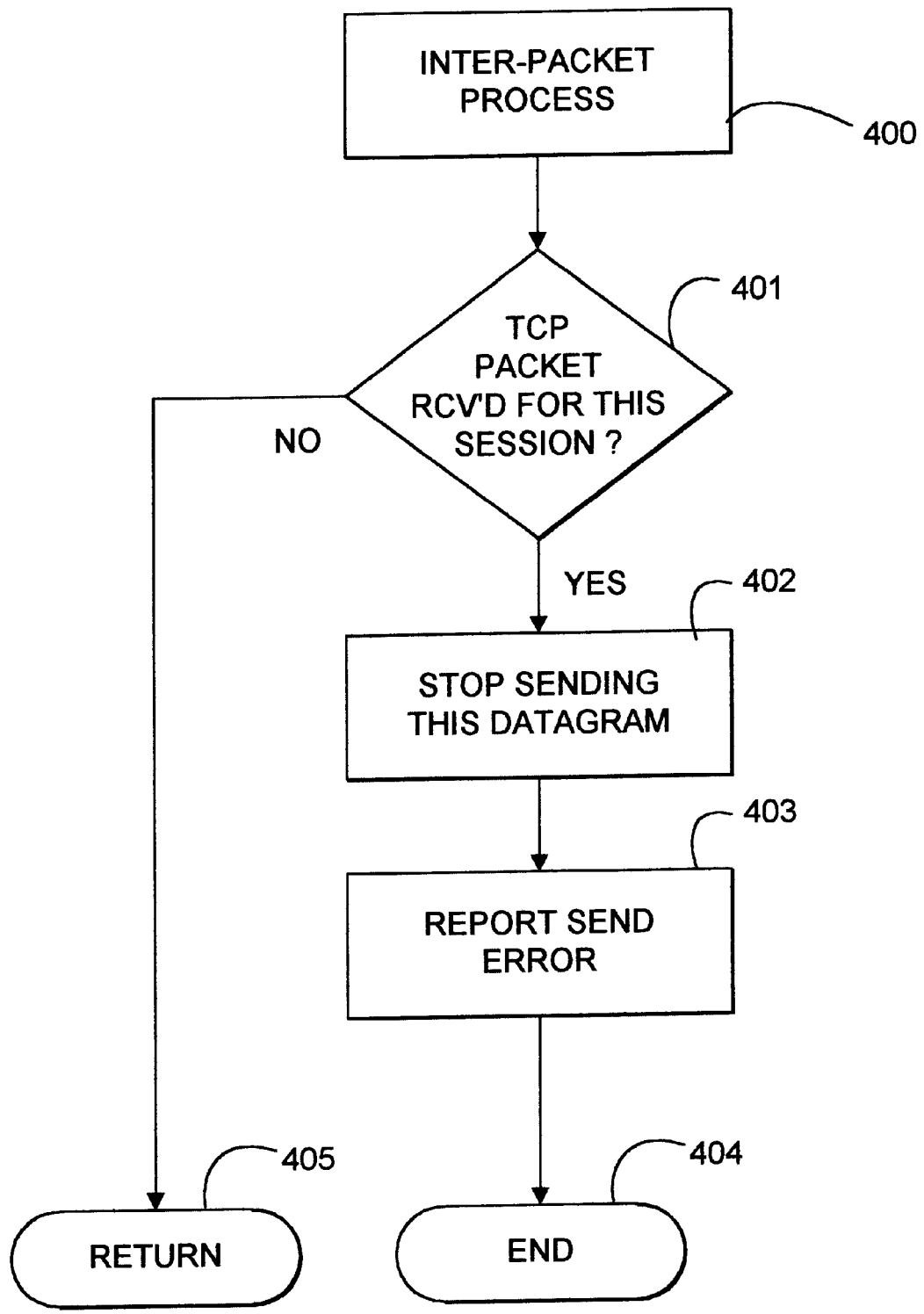
FIG. 7 illustrates another optional inter-packet process to be executed by the network interface driver.

FIGS. 5–7 illustrate the processing executed in the smart network interface card according to the present invention. These processes are executed by the CPU on the network interface card 15 under control of computer software stored in the program memory of the network interface. Alternative systems may implement these processes in a dedicated state machine or other dedicated logic on a network interface card. Other techniques for implementing the offloading this processing from the host processor may also be used.

FIG. 5 shows the basic processing which results in offloading of the segmentation of a large datagram into a plurality of packets based on the TCP/IP header template and the large datagram of FIG. 4. The process begins when the network interface driver receives a send request from the driver (step 200). The network interface determines whether the segmentation command is included with the request (step 201). If not, the packet is pulled from the host buffers using the gather descriptors provided by the driver (step 202). The packet is then provided to a send process for transmission on the network according to the MAC layer processes (step 203). The process ends upon successful transmission of the packet (step 204).

If at step 201, the segmentation command had been received with the send request, the algorithm branches to step 205. At step 205, the smart interface reads the MSS parameter from the out-of-band data provided with the datagram. The driver then proceeds to pull MSS sized segments using the gather descriptors for the datagram (step 206). The adapter might A) download the whole large datagram and cut it up on the adapter or B) only download the header (and perhaps some of the payload) and download additional payload as needed. As the segments are pulled, a header is produced from the template header and checksums are computed (step 207). The process of computing the header for each packet in the plurality of packets being generated for each datagram includes incrementing the identification field for each packet after use of the identification field in the template for the first packet, computing the checksums, and setting the sequence number for each subsequent packet as appropriate, typically equal to the sequence number of the previous packet plus its length which is equal to MSS in the normal case, except for usually the last packet in the set. Finally the actual length of the packet is calculated and set for the packet to be transmitted. The other processing for the special control parameters and the like is provided as discussed above.

The packet send process is then executed for the current segment of the datagram (step 208). After the packet send process, the algorithm determines whether the datagram is finished (step 209). If it is finished, then the process ends at step 204. The packet send process may be initiated for a given packet, while step 209 is executed for a following packet in parallel. If the datagram is not finished at step 209, then optional inter-packet processes (block 210) are executed and the algorithm returns to step 206 to pull the next MSS sized segment (or less at the end of the datagram). The optional inter-packet processes 210 include for example the processes of FIGS. 6 and 7. In a simplified embodiment, there are no inter-packet processes, and the algorithm is repeated until the datagram is finished.

FIG. 6 illustrates example inter-packet processes which begin at step 300, when the inter-packet process is called by the network interface. First, the inter-packet process involves determining whether a more recent datagram has been supplied from the higher layers (step 301). If yes, then it is also determined whether a more recent window and acknowledgment fields are being provided by the more recent datagram (step 302). If they are more recent, then the template for the current datagram is updated (step 303). If not, or after updating the template, the process then proceeds to determine whether the sequence parameters in the template are out of order between the current datagram and the more recent datagram (step 304). If the sequence parameters are out of order, then the current datagram is stopped, and the process for the more recent datagram is initiated (step 305). Thus for example, if the more recent datagram has an earlier sequence number than the sequence number of the current datagram, then it indicates that data is being retransmitted from earlier in the sequence. In this case, it is efficient in some circumstances to stop transmitting of the current datagram, and send the datagram carrying the earlier sequence number to improve the order of reception at the destination.

If at step 304, the sequence processing is not out of order, or at step 301, there is no more recent datagram, then the process branches to step 206 of FIG. 5 to return to processing of the current datagram.

FIG. 7 illustrates another inter-packet process which may be executed at point 210 in FIG. 5. This inter-packet process begins at step 400 upon calling of the inter-packet process. The algorithm first determines whether a TCP packet with a non-zero payload has been received for this session (step 401). If such a packet is received, then the datagram is abandoned and further packets are stopped (step 402). After stopping the sending of the current datagram, a send error is reported to the TCP/IP stack (step 403) which has responsibility for retrying the datagram. After reporting the send error, the process ends (step 404) like at step 204 of FIG. 5. Also, if no such packet is received at step 401, then the process returns (step 405) to normal processing of the current datagram.

The inter-packet processes of FIGS. 6 and 7 could all be implemented, or could be implemented one at a time in a particular embodiment of the present invention. Also, as other functions of the TCP protocol for the transmit process are offloaded to the smart network interface adapter, additional inter-packet processes could be executed.

For example, the adapter processing can be limited by providing a packet control field template which matches a TCP/IP header template, and having TCP, URG, RST, SYN and FIN flags set to no action states, and the urgent pointer field set to zero.

In an alternative, the URG flag and URG pointer identifying a byte in the datagram may be set in the template, and the network interface sets the URG flag and URG pointer in a packet in the plurality of packets which includes said byte.

In another alternative, the FIN flag is included in the template, and the network interface, if the FIN flag is set in the TCP/IP header template, sets the FIN flag in a last packet in the plurality of packets. In another alternative, the PSH flag is included in the template, and the network interface, if the PSH flag is set in the template, sets the PSH flag in a last packet (or other packet as determined by the context of the send process) in the plurality of packets.

Thus, the present invention offloads common processing functions to the adapter, while leaving as much complexity and flexibility on the host as possible. The results are improved performance, reduced host CPU utilization, and improved scalability of the process. Further, the function is implemented without adding new functions or interfaces to the existing network driver specifications for standard systems, such as the NDIS. Further, the preferred system remains compatible with intermediate drivers to the extent possible.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method for sending data on a network from a data source executing a network protocol which includes a process for generating packet control data for packets according to the network protocol, through a network interface including medium access control layer processes, comprising:

establishing a connection with a destination for a session according to the network protocol;

determining a window size from the destination according to the network protocol, which indicates an amount of data the destination is ready to receive;

defining a datagram in the data source, including generating a packet control data template and supplying a data payload having a size less than or equal to the window size;

supplying the datagram to the network interface;

generating in the network interface, a plurality of packets from the datagram, the plurality of packets including respective packet control data based on the packet control data template, and including respective segments of the data payload;

sending the plurality of packets to the destination; and receiving acknowledgment from the destination of receipt of the plurality of packets according to the network protocol.

2. The method of claim 1, wherein the acknowledgment carries an indication of an updated window size for the destination.

3. The method of claim 2, including if a packet with data is received for the session before a last packet in the plurality of packets is sent, then abandoning the unsent packets in the plurality of packets, and resending the datagram.

4. The method of claim 1, including holding acknowledgment and window values for a given datagram session in a location accessible by the network interface, and reading in the network interface the values stored in said location during the sending of the plurality of packets.

5. The method of claim 1, including holding in the network interface, recieved packets during the sending of the plurality of packets, until the plurality of packets has been sent.

6. The method of claim 1, wherein the step of supplying includes providing a segment size parameter, and a segmentation request to the network interface.

7. The method of claims 1, wherein the step of supplying includes providing a segment size parameter outside the datagram.

8. The method of claim 1, wherein the packet control data template includes a reserved field, and the step of supplying includes providing a segment size parameter to the network interface by a path outside the datagram and a segmentation request to the network interface by setting a bit in the reserved field.

9. The method of claim 1, wherein the step of supplying includes providing a segment size parameter and a segmentation request to the network interface by a path outside the datagram.

10. The method of claim 1, wherein the packet control data template includes a packet header template.

11. The method of claim 1, wherein the network protocol comprises TCP/IP, and the packet control data template comprises a TCP/IP header template.

12. The method of claim 1, wherein the network interface supports packets having a prespecified length, and the data payload is greater than the prespecified length.

13. The method of claim 1, wherein the network protocol comprises TCP/IP, and the packet control data template comprises a TCP/IP header template including having an IP total length field set to indicate the length of the data payload, and wherein the step of generating in the network interface includes setting IP total length fields in the plurality of packets, based on size or sizes of the respective segments of the data payload in the plurality of packets.

14. The method of claim 1, wherein the network protocol comprises TCP/IP, and the packet control data template comprises a TCP/IP header template including having an IP identification field set to an initial value for the datagram, and wherein the step of generating in the network interface includes setting IP identification values in the plurality of packets based on said initial value.

15. The method of claim 1, wherein the network protocol comprises TCP/IP, and the packet control data template comprises a TCP/IP header template including having an initial TCP sequence number set for the datagram, and wherein the step of generating in the network interface includes setting TCP sequence numbers for the plurality of packets based on the initial TCP sequence number and the size or sizes of the respective segments of the data payload in the plurality of packets.

16. The method of claim 1, wherein the network protocol comprises TCP/IP, and the packet control data template comprises a TCP/IP header template including having an IP header checksum field, and a TCP checksum field, and wherein the step of generating the plurality of packets in the network interface includes computing IP header checksums and TCP checksums for the plurality of packets.

17. The method of claim 1, wherein the network protocol comprises TCP/IP, and the packet control data template comprises a TCP/IP header template having a TCP header PSH flag, and wherein the step of generating the plurality of packets in the network interface includes if the TCP header PSH flag is set to a no action state, setting the TCP header PSH flag in the packet headers to the no action state, and includes if the TCP header PSH flag is set to a push state, setting the TCP header PSH flag in a last packet in the plurality of packets to the push state, and for other packets in the plurality of packets to the no action state.

18. The method of claim 1, wherein the network protocol comprises TCP/IP, and the packet control data template comprises a TCP/IP header template including having a TCP header acknowledgment number and window field, and wherein the step of generating the plurality of packets in the network interface includes setting the TCP header acknowledgment number and window field to the values in the TCP/IP header template.

19. The method of claim 1, wherein the network protocol comprises TCP/IP, and the packet control data template comprises a TCP/IP header template including having a TCP header acknowledgment number and window field, and wherein the step of generating the plurality of packets in the network interface includes before sending each packet in the plurality of packets, if no more recent datagram has been supplied, then setting the TCP header acknowledgment number and window field to the values in the TCP/IP header template, and if a more recent datagram has been supplied, then setting the TCP header acknowledgment number and window field to the values in the TCP/IP header template of the more recent datagram.

20. The method of claim 1, wherein the network protocol comprises TCP/IP, and the packet control data template comprises a TCP/IP header template including having a MF flag set to indicate no fragmentation, and a Fragment Offset field set to zero.

21. The method of claim 1, wherein the network protocol comprises TCP/IP, and the packet control data template comprises a TCP/IP header template including having an IP options field set to indicate no options.

22. The method of claim 1, wherein the network protocol comprises TCP/IP, and the packet control data template comprises a TCP/IP header template including having TCP, URG, RST, SYN and FIN flags set to no action states, and the urgent pointer field set to zero.

23. The method of claim 1, wherein the network protocol comprises TCP/IP, and the packet control data template comprises a TCP/IP header template having an URG flag and a URG pointer identifying a byte in the datagram, and including in the network interface flag and setting the URG pointer in a packet in the plurality of packets which includes said byte.

24. The method of claim 1, wherein the network protocol comprises TCP/IP, and the packet control data template comprises a TCP/IP header template having an URG flag and a URG pointer identifying a byte in the datagram, and including in the network interface setting the URG flag and URG pointer in a packet in the plurality of packets which includes said byte.

25. The method of claim 1, wherein the network protocol comprises TCP/IP, and the packet control data template comprises a TCP/IP header template having a FIN flag, and including in the network interface, if the FIN flag is set in the TCP/IP header template, setting the FIN flag in a last packet in the plurality of packets.

26. The method of claim 1, wherein the network protocol comprises TCP/IP, and the packet control data template comprises a TCP/IP header template having a PSH flag, and including in the network interface, if the PSH flag is set in the TCP/IP header template, setting the PSH flag in at least one packet in the plurality of packets.

27. The method of claim 1, including sending a plurality of datagrams to the network interface for the same session, and wherein the step of generating the plurality of packets for a current datagram includes for a last packet in the plurality of packets, determining whether data from a following datagram falls in sequence, and if it does, then concatenating data from the current datagram with data from the following datagram in the last packet.

28. The method of claim 1, including sending a plurality of datagrams to the network interface for the same session, and wherein the step of generating the plurality of packets for a current datagram includes determining whether a more recent datagram has been supplied, and if it has, then updating the template for the current datagram based upon the more recent datagram.

29. The method of claim 1, including sending a plurality of datagrams to the network interface for the same session, and assigning sequence numbers to the plurality of datagrams, and wherein the step of generating the plurality of packets for a current datagram includes determining whether a more recent datagram has been supplied having a sequence number which precedes a sequence number in the current datagram, and if it has, then stopping the generating of the plurality of packets for the current datagram, and beginning the generating of the plurality of packets for the more recent datagram.

30. A method for sending data on a network from a data source executing a TCP/IP network protocol which includes a process for generating TCP/IP headers for packets according to the network protocol, through a network interface, comprising:

establishing a connection with a destination for a session according to the TCP/IP network protocol;

determining a TCP window size from the destination, which indicates an amount of data the destination is ready to receive;

defining a datagram in the data source, including generating a TCP/IP header template and supplying a data payload having a size less than or equal to the window size;

supplying the datagram, a segment size parameter, and a request to segment the datagram to the network interface;

generating in the network interface, in response to the segment size parameter and to the request to segment, a plurality of packets from the datagram, including executing processes in the network interface to provide respective TCP/IP headers based on the TCP/IP header template, to provide respective segments of the data payload having lengths equal to or less than the segment size parameter, and to compute IP header checksums and TCP checksums for the plurality of packets;

sending the plurality of packets to the destination; and receiving acknowledgment from the destination of receipt of the plurality of packets according to the network protocol.

31. The method of claim 30, including if a TCP packet with a non-zero data payload is received before a last packet in the plurality of packets is sent, then abandoning the unsent packets in the plurality of packets, and resending the datagram.

32. The method of claim 30, wherein the step of supplying includes providing the segment size parameter outside the datagram.

33. The method of claim 30, wherein the TCP/IP header template includes a reserved field, and the step of supplying includes providing the segment size parameter to the network interface by a path outside the datagram, and the segmentation request to the network interface by setting a bit in the reserved field.

34. The method of claim 30, wherein the acknowledgment carries an indication of a updated window size for the destination.

35. The method of claim 30, wherein the TCP/IP header template includes an IP total length field set to indicate the length of the data payload, and wherein the step of generating in the network interface includes setting IP total length fields in the plurality of packets, based on size or sizes of the respective segments of the data payload in the plurality of packets.

36. The method of claim 30, wherein the TCP/IP header template includes an IP identification field set to an initial value for the datagram, and wherein the step of generating in the network interface includes setting IP identification values in the plurality of packets based on said initial value.

37. The method of claim 30, wherein TCP/IP header template includes an initial TCP sequence number set for the datagram, and wherein the step of generating in the network interface includes setting TCP sequence numbers for the plurality of packets based on the initial TCP sequence number and the size or sizes of the respective segments of the data payload in the plurality of packets.

38. The method of claim 30, wherein the TCP/IP header template includes a TCP header PSH flag, and wherein the step of generating the plurality of packets in the network interface includes if the TCP header PSH flag is set to a no action state, setting the TCP header PSH flag in the packet headers to the no action state, and includes if the TCP header PSH flag is set to a push state, setting the TCP header PSH flag in a last packet in the plurality of packets to the push state, and for other packets in the plurality of packets to the no action state.

39. The method of claim 30, wherein the TCP/IP header template includes a TCP header acknowledgment number and window field, and wherein the step of generating the plurality of packets in the network interface includes setting the TCP header acknowledgment number and window field to the values in the TCP/IP header template.

40. The method of claim 30, wherein the TCP/IP header template includes a TCP header acknowledgment number and window field, and wherein the step of generating the plurality of packets in the network interface includes before sending each packet in the plurality of packets if no more recent datagram has been supplied, then setting the TCP header acknowledgment number and window field to the values in the TCP/IP header template, and if a more recent datagram has been supplied, then setting the TCP header acknowledgment number and window field to the values in the TCP/IP header template of the more recent datagram.

41. The method of claim 30, wherein the TCP/IP header template includes a MF flag set to indicate no fragmentation, and a Fragment Offset field set to zero.

42. The method of claim 30, wherein the TCP/IP header template includes an IP options field set to indicate no options.

43. The method of claim 30, wherein the TCP/IP header template includes TCP, URG, RST, SYN and FIN flags set to no action states, and the urgent pointer field set to zero.

44. The method of claim 30, wherein the TCP/IP header template having an URG flag and a URG pointer identifying a byte in the datagram, and including in the network interface flag and setting the URG pointer in a packet in the plurality of packets which includes said byte.

45. The method of claim 30, wherein the TCP/IP header template having a FIN flag, and including in the network interface, if the FIN flag is set in the TCP/IP header template, setting the FIN flag in a last packet in the plurality of packets.

46. The method of claim 30, wherein the TCP/IP header template having a PSH flag, and including in the network interface, if the PSH flag is set in the TCP/IP header template, setting the PSH flag in at least one packet in the plurality of packets.

47. The method of claim 30, including sending a plurality of datagrams to the network interface for the same session, and wherein the step of generating the plurality of packets for a current datagram includes for a last packet in the plurality of packets, determining whether data from a following datagram falls in sequence, and if it does, then concatenating data from the current datagram with data from the following datagram in the last packet.

48. The method of claim 30, including sending a plurality of datagrams to the network interface for the same session, and wherein the step of generating the plurality of packets for a current datagram includes determining whether a more recent datagram has been supplied, and if it has, then updating the template for the current datagram based upon the more recent datagram.

49. The method of claim 30, including sending a plurality of datagrams to the network interface for the same session, and assigning sequence numbers to the plurality of datagrams, and wherein the step of generating the plurality of packets for a current datagram includes determining whether a more recent datagram has been supplied having a sequence number which precedes a sequence number in the current datagram, and if it has, then stopping the generating of the plurality of packets for the current datagram, and beginning the generating of the plurality of packets for the more recent datagram.

50. A network interface device coupled to a host system including a data source, the data source executing a network protocol which includes a process for generating packet control data for packets according to the network protocol and sending packet on the network, comprising:
   a host interface coupled to the host system, adapted to receive a datagram in the data source, the datagram including a packet control data template and a data payload;
   memory to store at least portions of the datagram to the network interface;
   a processor that generates a plurality of packets from the datagram, the plurality of packets including respective packet control data based on the packet control data template, and including respective segments of the data payload; and
   a medium access control unit coupled to the memory and to a network medium that manages transfer of the plurality of packets to the network from the memory.

51. The network interface device of claim 50, wherein the packet control data template includes a packet header template.

52. The network interface device of claim 50, wherein the network protocol comprises TCP/IP, and the packet control data template comprises a TCP/IP header template.

53. The network interface device of claim 50, wherein the medium access control unit supports packets having a prespecified length, and the data payload is greater than the prespecified length.

54. The network interface device of claim 50, wherein the network protocol comprises TCP/IP, and the packet control data template comprises a TCP/IP header template including having an IP total length field set to indicate the length of the data payload, and wherein the process of generating the plurality of packets includes setting IP total length fields in the plurality of packets, based on size or sizes of the respective segments of the data payload in the plurality of packets.

55. The network interface device of claim 50, wherein the network protocol comprises TCP/IP, and the packet control data template comprises a TCP/IP header template including having an IP identification field set to an initial value for the datagram, and wherein the process of generating the plurality of packets includes setting IP identification values in the plurality of packets based on said initial value.

56. The network interface device of claim 50, wherein the network protocol comprises TCP/IP, and the packet control data template comprises a TCP/IP header template including having an initial TCP sequence number set for the datagram, and wherein the process of generating the plurality of packets includes setting TCP sequence numbers for the plurality of packets based on the initial TCP sequence number and the size or sizes of the respective segments of the data payload in the plurality of packets.

57. The network interface device of claim 50, wherein the network protocol comprises TCP/IP, and the packet control data template comprises a TCP/IP header template including having an IP header checksum field, and a TCP checksum field, and wherein the process of generating the plurality of packets includes computing IP header checksums and TCP checksums for the plurality of packets.

58. The network interface device of claim 50, wherein the network protocol comprises TCP/IP, and the packet control data template comprises a TCP/IP header template including having a TCP header PSH flag, and wherein the process of generating the plurality of packets includes if the TCP header PSH flag is set to a no action state, setting the TCP header PSH flag in the packet headers to the no action state, and includes if the TCP header PSH flag is set to a push state, setting the TCP header PSH flag in a last packet in the plurality of packets to the push state, and for other packets in the plurality of packets to the no action state.

59. The network interface device of claim 50, wherein the network protocol comprises TCP/IP, and the packet control data template comprises a TCP/IP header template including having a TCP header acknowledgment number and window field, and wherein the process of generating the plurality of packets includes setting the TCP header acknowledgment number and window field to the values in the TCP/IP header template.

60. The network interface device of claim 50, wherein the network protocol comprises TCP/IP, and the packet control data template comprises a TCP/IP header template including having a MF flag set to indicate no fragmentation, and a Fragment Offset field set to zero.

61. The network interface device of claim 50, wherein the network protocol comprises TCP/IP, and the packet control data template comprises a TCP/IP header template including having an IP options field set to indicate no options.

62. The network interface device of claim 50, wherein the network protocol comprises TCP/IP, and the packet control data template comprises a TCP/IP header template including having TCP, URG, RST, SYN and FIN flags set to no action states, and the urgent pointer field set to zero.

63. The network interface device of claim 50, wherein the network protocol comprises TCP/IP, and the packet control data template comprises a TCP/IP header template having an URG flag and a URG pointer identifying a byte in the datagram, and including in the network interface resource to set the URG flag and pointer in a packet in the plurality of packets which includes said byte.

64. The network interface device of claim 50, wherein the network protocol comprises TCP/IP, and the packet control data template comprises a TCP/IP header template having a FIN flag, and including in the network interface, resources which if the FIN flag is set in the TCP/IP header template, set the FIN flag in a last packet in the plurality of packets.

65. The network interface device of claim 50, wherein the network protocol comprises TCP/IP, and the packet control data template comprises a TCP/IP header template having a PSH flag, and including in the network interface, resources which if the PSH flag is set in the TCP/IP header template, set the PSH flag in at least one packet in the plurality of packets.

66. The network interface device of claim 50, including resources in the network interface to read acknowledgment and window values stored in a predetermined location during the sending of the plurality of packets.

67. The network interface device of claim 50, including resources to hold in the network interface, received packets during the sending of the plurality of packets, until the plurality of packets has been sent.

68. A method for sending data on a network from a data source executing a network protocol which includes a process for generating packet control data for packets according to the network protocol, through a network interface, comprising:

defining a datagram in the data source, including generating a packet control data template and supplying a data payload;

supplying the datagram to the network interface;

generating in the network interface at the medium access control layer, a plurality of packets from the datagram, the plurality of packets including respective packet control data based on the packet control data template, and including respective segments of the data payload.

69. The method of claim 68, wherein the packet control data template includes a packet header template.

70. The method of claim 68, wherein the network protocol comprises TCP/IP, and the packet control data template comprises a TCP/IP header template.

71. The method of claim 68, wherein the network interface supports packets having a prespecified length, and the data payload is greater than the prespecified length.

72. The method of claim 68, wherein the network protocol comprises TCP/IP, and the packet control data template comprises a TCP/IP header template including having an IP total length field set to indicate the length of the data payload, and wherein the step of generating in the network interface includes setting IP total length fields in the plurality of packets, based on size or sizes of the respective segments of the data payload in the plurality of packets.

73. The method of claim 68, wherein the network protocol comprises TCP/IP, and the packet control data template comprises a TCP/IP header template including having an IP identification field set to an initial value for the datagram, and wherein the step of generating in the network interface includes setting IP identification values in the plurality of packets based on said initial value.

74. The method of claim 68, wherein the network protocol comprises TCP/IP, and the packet control data template comprises a TCP/IP header template including having an initial TCP sequence number set for the datagram, and wherein the step of generating in the network interface includes setting TCP sequence numbers for the plurality of packets based on the initial TCP sequence number and the size or sizes of the respective segments of the data payload in the plurality of packets.

75. The method of claim 68, wherein the network protocol comprises TCP/IP, and the packet control data template comprises a TCP/IP header template including having an IP header checksum field, and a TCP checksum field, and wherein the step of generating the plurality of packets in the network interface includes computing IP header checksums and TCP checksums for the plurality of packets.

76. The method of claim 68, wherein the network protocol comprises TCP/IP, and the packet control data template comprises a TCP/IP header template including having a TCP header PSH flag, and wherein the step of generating the plurality of packets in the network interface includes if the TCP header PSH flag is set to a no action state, setting the TCP header PSH flag in the packet headers to the no action state, and includes if the TCP header PSH flag is set to a push state, setting the TCP header PSH flag in a last packet in the plurality of packets to the push state, and for other packets in the plurality of packets to the no action state.

77. The method of claim 68, wherein the network protocol comprises TCP/IP, and the packet control data template comprises a TCP/IP header template including having a TCP header acknowledgment number and window field, and wherein the step of generating the plurality of packets in the network interface includes setting the TCP header acknowledgment number and window field to the values in the TCP/IP header template.

78. The method of claim 68, wherein the network protocol comprises TCP/IP, and the packet control data template comprises a TCP/IP header template including having a MF flag set to indicate no fragmentation, and a Fragment Offset field set to zero.

79. The method of claim 68, wherein the network protocol comprises TCP/IP, and the packet control data template comprises a TCP/IP header template including having an IP options field set to indicate no options.

80. The method of claim 68, wherein the network protocol comprises TCP/IP, and the packet control data template comprises a TCP/IP header template including having TCP, URG, RST, SYN and FIN flags set to no action states, and the urgent pointer field set to zero.

81. The method of claim 68, wherein the network protocol comprises TCP/IP, and the packet control data template comprises a TCP/IP header template having an URG flag and a URG pointer identifying a byte in the datagram, and including in the network interface setting the URG flag and URG pointer in a packet in the plurality of packets which includes said byte.

82. The method of claim 68, wherein the network protocol comprises TCP/IP, and the packet control data template comprises a TCP/IP header template having a FIN flag, and including in the network interface, if the FIN flag is set in the TCP/IP header template, setting the FIN flag in a last packet in the plurality of packets.

83. The method of claim 68, wherein the network protocol comprises TCP/IP, and the packet control data template comprises a TCP/IP header template having a PSH flag, and including in the network interface, if the PSH flag is set in the TCP/IP header template, setting the PSH flag in at least one packet in the plurality of packets.

* * * * *